United States Patent [19]
Alber et al.

[11] Patent Number: 5,704,251
[45] Date of Patent: Jan. 6, 1998

[54] MOTOR VEHICLE GEARBOX WITH INTERNAL SHIFT SYSTEM

[75] Inventors: Heinz Alber, Leinfelden-Echterdomgen; Friedhelm Nebel, Backnang; Hartmut Nied, Waiblingen, all of Germany

[73] Assignee: Mercedes-Benz AG, Germany

[21] Appl. No.: 738,577

[22] Filed: Oct. 29, 1996

Related U.S. Application Data

[63] Continuation of Ser. No. 568,573, Dec. 7, 1995, abandoned.

[30] Foreign Application Priority Data

Dec. 7, 1994 [DE] Germany ............... 44 43 523.1

[51] Int. Cl.$^6$ ............................................. B60K 20/00
[52] U.S. Cl. ................. 74/473 R; 74/325; 74/335; 74/475; 74/477
[58] Field of Search ................ 74/325, 333, 335, 74/340, 356, 473 R, 475, 477, 483 R

[56] References Cited

U.S. PATENT DOCUMENTS

| | | |
|---|---|---|
| 3,500,697 | 3/1970 | Schowalter. |
| 4,520,685 | 6/1985 | Takahashi ............ 74/473 R |
| 4,539,859 | 9/1985 | Arai et al. ............ 74/473 R X |
| 4,543,844 | 10/1985 | Inui et al. ............ 74/473 R |
| 4,558,610 | 12/1985 | Takahashi ............ 74/473 R |
| 4,836,041 | 6/1989 | Falzoni et al. ............ 74/329 X |
| 5,052,239 | 10/1991 | Ubagai ............ 74/473 R |
| 5,101,680 | 4/1992 | Parsons ............ 74/475 |
| 5,321,993 | 6/1994 | Herzog et al. ............ 74/473 R |
| 5,331,863 | 7/1994 | Kobayashi et al. ............ 74/473 R X |
| 5,433,125 | 7/1995 | Muller ............ 74/335 X |
| 5,450,767 | 9/1995 | Willford et al. ............ 74/335 |
| 5,492,209 | 2/1996 | Certeza ............ 74/475 X |

FOREIGN PATENT DOCUMENTS

| | | |
|---|---|---|
| 0 293 288 | 11/1988 | European Pat. Off.. |
| 0 553 017 | 7/1993 | European Pat. Off.. |
| 0 582 804 | 2/1994 | European Pat. Off.. |
| 1 680 046 | 4/1972 | Germany. |
| 31 36 923 | 1/1983 | Germany. |
| 2 225 068 | 5/1990 | United Kingdom. |

*Primary Examiner*—Charles A. Marmor
*Assistant Examiner*—Peter T. Kwon
*Attorney, Agent, or Firm*—Evenson, McKeown, Edwards & Lenahan, P.L.L.C.

[57] ABSTRACT

In a gearbox of a motor vehicle, a shift console is installed with a shifter shaft unit as a preassembled module in a housing opening of a transmission housing that houses a driveshaft. The shift housing part has a mounting flange extending transversely to a geometric bearing axis with a flange opening flush with the geometric bearing axis. One bearing system is located in the vicinity of the flange opening, and the other bearing system is located on an end of shift console opposite the mounting flange. A shaft end of the shifter shaft adjacent the bearing system located in the vicinity of flange opening includes the connection for operating the shifter shaft. The transmission housing has a housing opening coverable externally by the mounting flange for inserting the shift console into the transmission housing. The shift console with the shift finger and the shift rail which has the shifting groove are located inside the transmission housing, with the geometric bearing axis being perpendicular to a rotational axis of the driveshaft.

21 Claims, 8 Drawing Sheets

MOTOR VEHICLE GEARBOX WITH INTERNAL SHIFT SYSTEM

This application is a continuation of application Ser. No. 08/568,573, filed on Dec. 7, 1995 now abandoned.

BACKGROUND AND SUMMARY OF THE INVENTION

The present invention relates to a gearbox for a motor vehicle, and more particularly, to a gearbox in which a driveshaft is mounted rotatably and axially nondisplaceable in a transmission housing. At least one idler gear is coupleable by a gear clutch with the driveshaft and rotatably mounted thereon. A shift housing part is operatively held in position relative to the transmission housing. A shifter shaft unit has a shifter shaft, with at least one shift finger being non movably connected with the shifter shaft. The shifter shaft actuates the shifter shaft in the directions of the shifter shaft axis. A shift console is fixed with respect to the shift housing part, and two bearing systems are mounted flush to a geometric bearing axis of the shift housing part and fixed on the shift console. The shift finger is engageable with a respective shifting groove of a shift rail connected kinematically with the gear clutch. One bearing system is located in a housing opening of the shift housing part coaxial with the geometric bearing axis, and connection of the shifter shaft for actuating the latter are accessible from the exterior by a housing opening in the shift housing part.

In a known gearbox as shown in DE 31 36 923 C1, the shift housing part is located on a drive tunnel laterally next to the driver's seat with the geometric bearing axis transverse to the length of the vehicle and is connected by a remote shifter with the gearbox which is located offset in the lengthwise direction of the vehicle. This remote shifter consists of an outer shift lever mounted pivotably on the shifter shaft, an outer shift lever nonrotatably mounted on an intermediate shaft that passes outward through the drive housing, a shift mechanism inside the housing that connects the intermediate shaft with the gear clutch, and an outer shift rail that connects the two outer shift levers with one another. The shifter shaft is connected directly with a manual shift lever. The shifting groove cooperating with the shift finger of the shifter shaft is formed by two slots located diametrically opposite one another in the bearing eye of the outer shift lever mounted on the shifter shaft.

An object of the present invention is to provide an improved gearbox with a shift system internal to the transmission, in which the shift system to be integrated into the transmission housing is configured as an independent readily assembled component and is largely independent of the structural details of the transmission housing.

The foregoing object has been advantageously achieved according to the present invention by providing that the shift housing part has a mounting flange extending transversely to the geometric bearing axis with a flange opening flush with the geometric bearing axis. One bearing system is located in the vicinity of the flange opening and the other bearing system is located on an end of shift console opposite the mounting flange. A shaft end of the shifter shaft adjacent the bearing system located in the vicinity of flange opening includes the connection for operating the shifter shaft, and the transmission housing has a housing opening coverable externally by the mounting flange for inserting the shift console into the transmission housing. The shift console with the shift finger and the shift rail which has the shifting groove are located inside the transmission housing, with the geometric bearing axis being perpendicular to a rotational axis of the driveshaft.

In the gearbox according to the present invention, only two components are required for the shift system inside the housing, i.e. the preassemblable module composed of the shift console and the shifter shaft unit as a first component and a clutch operating unit (shift rail, shift fork) for the respective gear clutch as a second component. The interfaces between the internal shift system and the transmission housing are thereby clearly defined and minimized in number.

In the gearbox according to the invention, tolerance chains between the transmission housing and the internal shift system are avoided. A limited variety of parts is achieved. The internal shift system can be delivered as a ready-to-install module for final assembly. Although this module is functionally reliable, it may nevertheless be rapidly replaced for repair if necessary.

The gearbox according to the present invention can be shifted both manually and automatically and can therefore be used in all drive systems such as front-wheel drive, rear-wheel drive, standard drive, transaxle, as well as all-wheel drive systems.

In the manually shifted embodiment of the gearbox according to the invention, a manual shift lever to be operated by the driver can be connected by a single remote shifter shaft with the connecting apparatus outside the housing of the shifter shaft unit integrated into the transmission housing.

One aspect of the present invention relates to the use of cable operation for the shifter shaft unit inside the housing as a remote shifter, in other words to an integral configuration of the connecting apparatus in this regard in the gearbox. This configuration is especially advantageous when it is necessary in particular to decouple relative movements between a vehicle part that supports the manual shift lever, and the gearbox.

An advantageous feature of the present invention relates to the fastening location of the shifter housing part on the transmission housing of the gearbox.

The above-mentioned second component of the shift system inside the housing in the gearbox according to the present invention makes an advantageous configuration possible.

The present invention further relates to the expanded configuration of the shift system inside the housing in that the shift console of the shift housing part in the gearbox is used somewhat as a multifunctional support. Thus, the various shifting functions such as shifting, blocking, locking, gate guide and the like are collected into an independent module.

BRIEF DESCRIPTION OF THE DRAWINGS

These and other objects, features and advantages of the present invention will become more readily apparent from the following detailed description thereof when taken in conjunction with the accompanying drawings wherein:

FIG. 4b is an isolated perspective view of the mounting of shift rails on an axis of the transmission housing as a preassembled module of the gearbox of FIG. 1, with the same perspective as FIGS. 4 and 4a;

FIG. 5 is a slightly different perspective view of the shift housing part as a preassembled module according to FIGS. 4 and 4a;

DETAILED DESCRIPTION OF THE DRAWINGS

Figure 1:
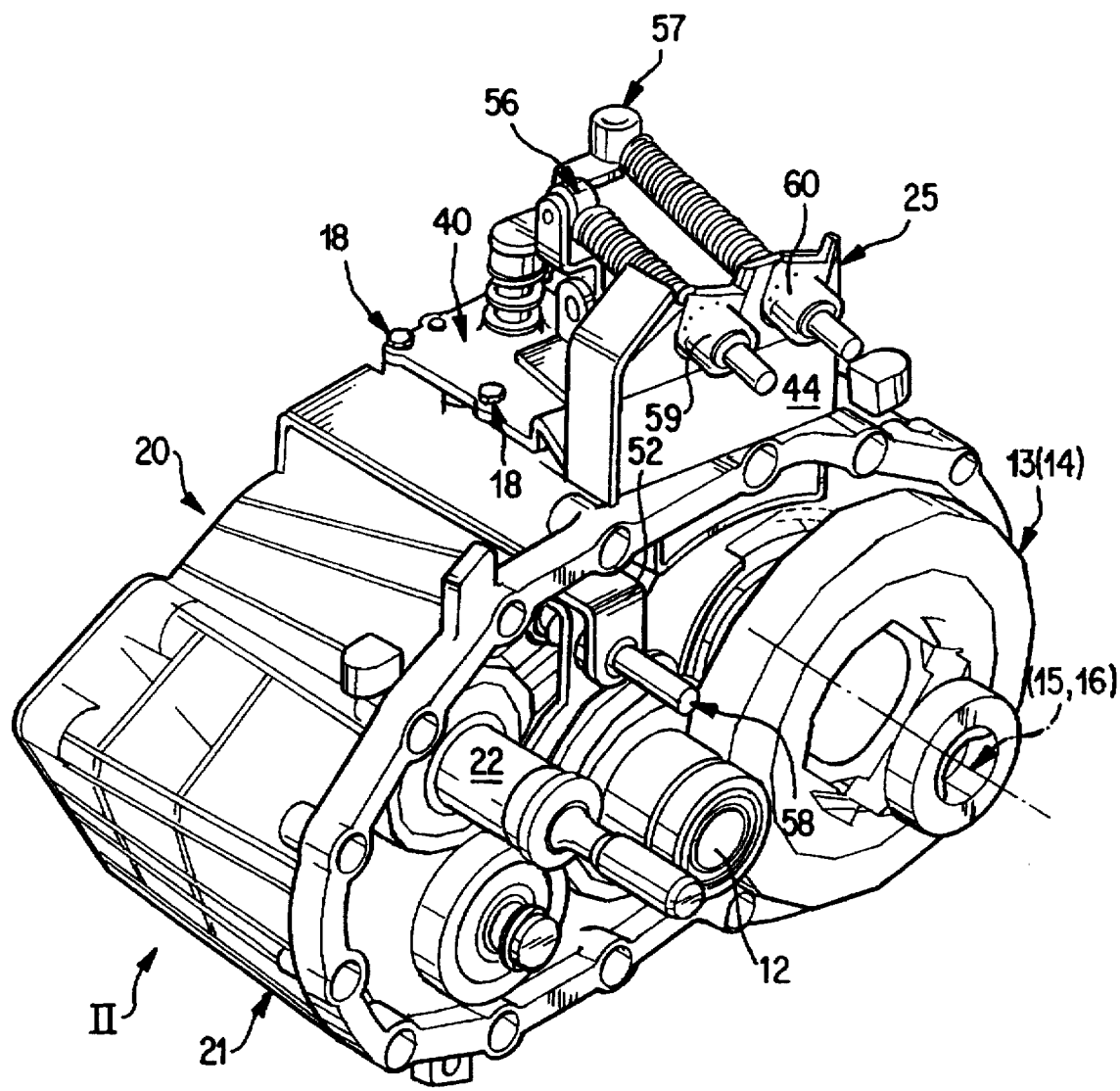
FIG. 1 is a perspective view of a gearbox according to the present invention.

In a gearbox 20 as seen in FIG. 1, a drive shaft 22 used as an input shaft and a drive shaft 12 used as an output shaft are connected with one another by six gear stages, whose idler gears, for example the idler gear 24 on drive shaft 22, are coupleable with their drive shafts by gear clutches, i.e. by gear clutch 23 for idler gear 24. The drive shaft 12 used as an output shaft is connected by a gear stage 13 with an axle differential 14 to drive two drive half shafts 15, 16 of a motor vehicle drive axle.

Drive housing 21 of the gearbox 20 is sealed off at one of its ends by a housing cover lid and, at its other end, a clutch housing 17 is flanged in place to receive the usual drive clutch which connects the input drive shaft 22 with an internal combustion engine crankshaft.

Figure 3:
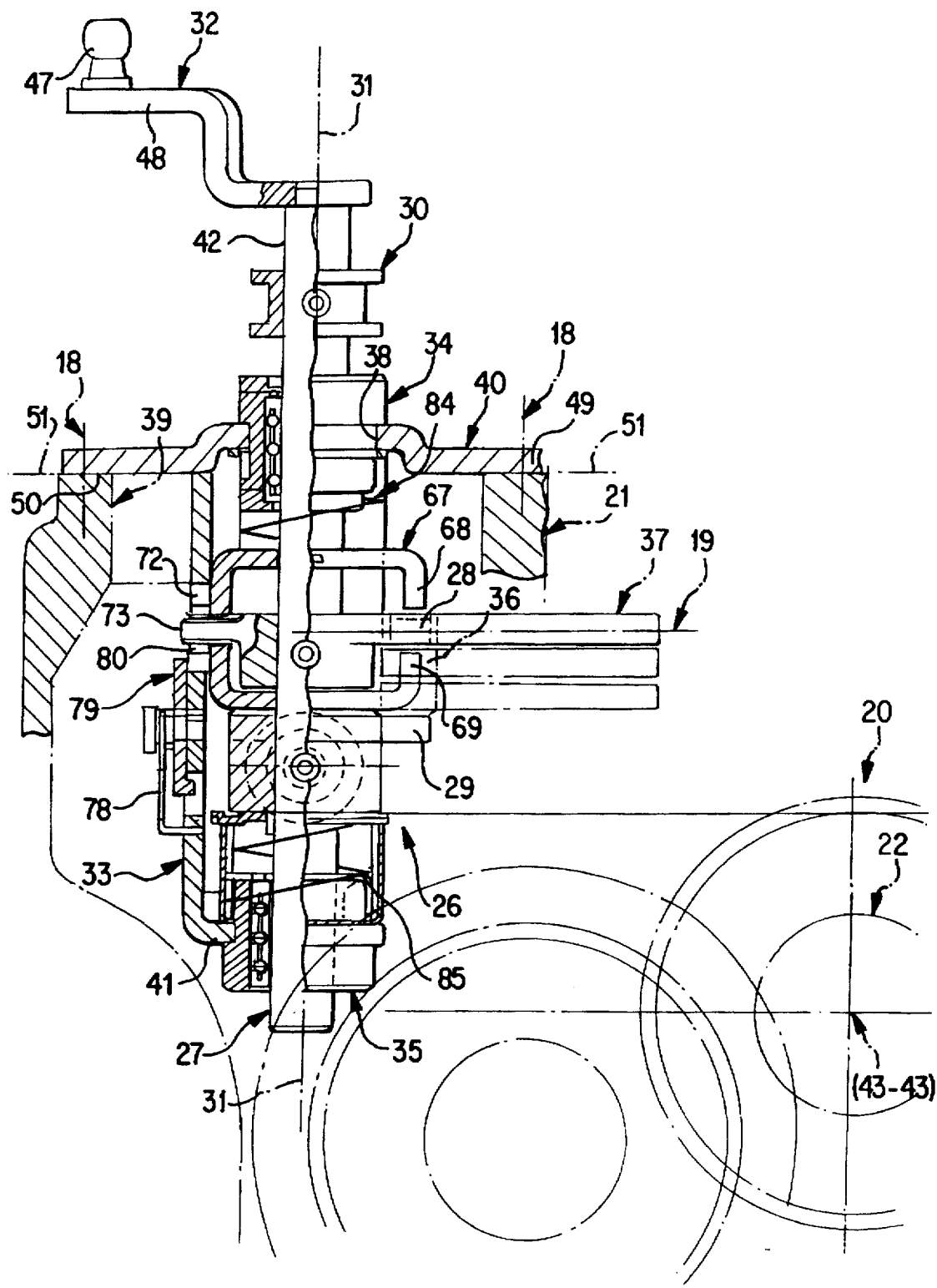
FIG. 3 is a partial section through the gearbox along line III—III of FIG. 2.
Figure 4:
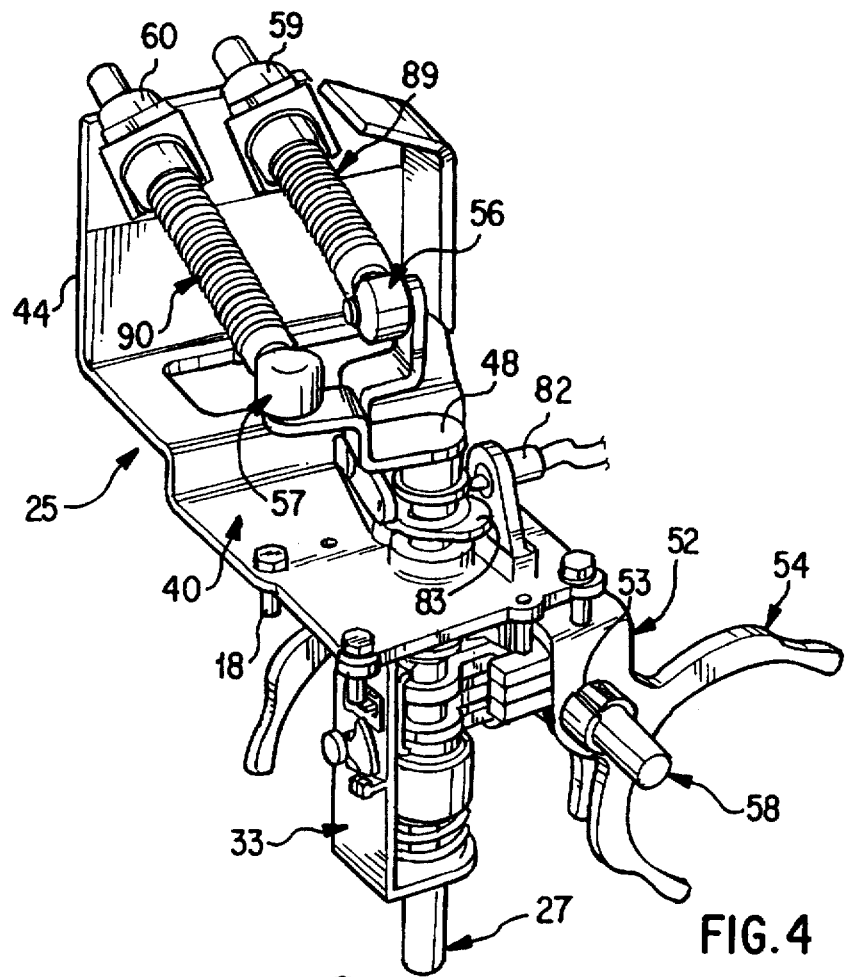
FIG. 4 is a perspective view of shift housing part as a premountable module of the gearbox looking in the direction of arrow IV in FIG. 2.
Figure 4A:
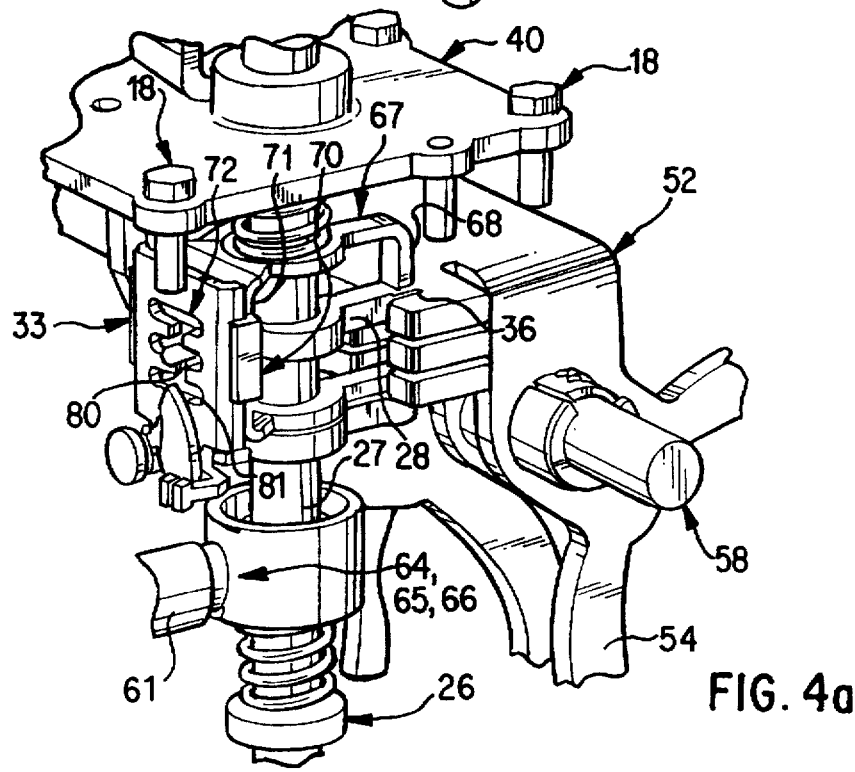
FIG. 4a is an enlarged perspective view of a portion of the shift housing part of FIG. 4.
Figure 4B:
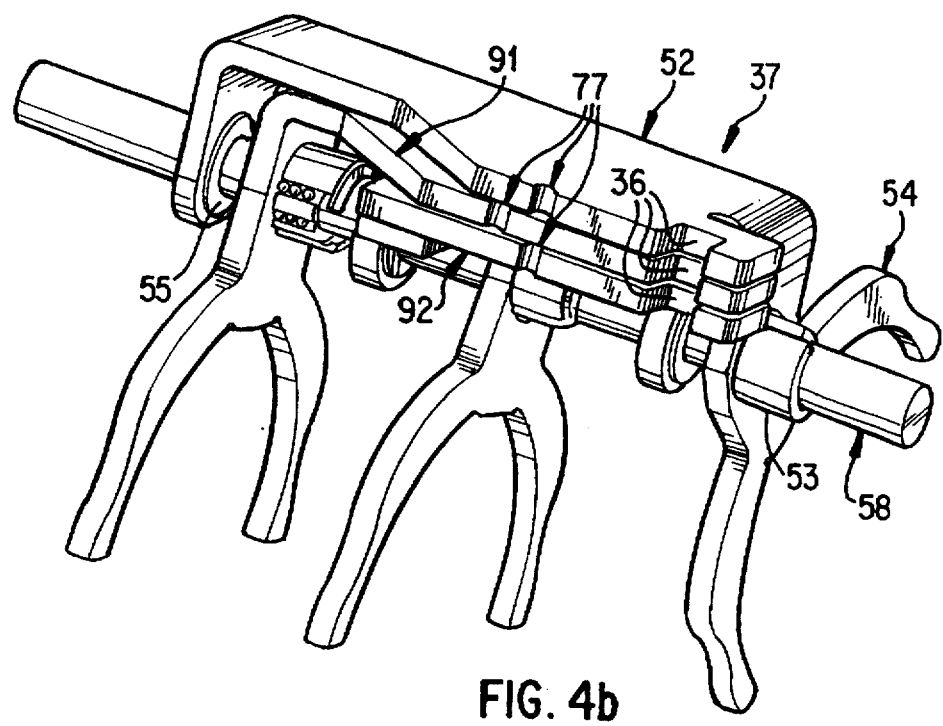

Gear clutch 23 is operable by a shift fork 54 of a shift rail 52 which is displaceably mounted on an axis 58 aligned parallel to rotational axis 43—43 of the drive shaft 22 and is mounted in the drive housing 21 by two bearing eyes 53, 55, staggered with respect to one another in the directions of rotational axis 43—43. The shift rail 52 has a shifting groove 36 (FIG. 3) for engagement of a shift finger 28 of a shifter shaft 27 as well as a lock 77 for engagement of a locking ball 76.

In addition, a geometric housing axis 31—31 (FIG. 3) perpendicular to the rotational axis 43—43 and a housing plane 51—51 perpendicular to the housing axis 31—31 and parallel to the rotational axis 43—43 are important for drive housing 21. Flush or aligned with housing axis 31—31 are the central axis of a housing opening 39 of drive housing 21, the central axis of a central opening 38 of a mounting flange 40 of a shift housing part 25, and the shifter shaft axis of shifter shaft 27. The drive housing 21 has a contact surface 49 that is located in the housing plane 51—51, in which the housing opening 39 terminates. Mounting flange 40 has a matching contact surface 50 in a flange plane in which the central opening 38 terminates. The mounting flange 40 is rigidly clamped against the contact surface 49 of the transmission housing 21 by bolts 18 around its contact surface 50.

A shift console 33 extends from the mounting flange 40 in the installed position within the transmission housing 11. The console 33 is used to mount a shifter shaft unit 26. For this mounting, two bearing systems 34, 35 are flush with the housing axis 31—31. One of the systems 34 is mounted in the central opening 38 of the mounting flange 40, and the other system 35 is mounted in a bearing eye 41 of the shift console 33 opposite the mounting flange 40. By way of these bearing systems 34, 35, the shifter shaft 27 is supported as the key component of the shifter shaft unit 26 so that it is rotationally and axially displaceable with respect to the shift housing part 25.

The shifter shaft unit 26 also has a locking hoop 67 with two locking cams 68, 69 located on both sides of the shift finger 28, a gate pin 73 located diametrically with respect to the shift finger 28 and immovably on the shifter shaft 27, an auxiliary shift finger 29 permanently attached to shifter shaft 27, and a locking element 64-65-66 which is immovable with respect to shifter shaft 77. A shifter cam 83 is located immovably opposite shifter shaft 27. Two centering springs 84, 85 hold the shifter shaft 27 in a resting position 19, and an outer shaft section 42 of the shifter shaft 27 is located in the installed position outside the transmission housing 21. A gate disk is immovably connected with the shaft section 42 as a connecting apparatus 30 for operating the shifter shaft 27 in the directions of the shifter shaft axis 31—31 via a joint 86, and a lever 48 is permanently connected with the shaft section 42 with a joint half 47 as a connector 32 for operating the shifter shaft 27 in the rotational directions via a joint 57.

Figure 2:
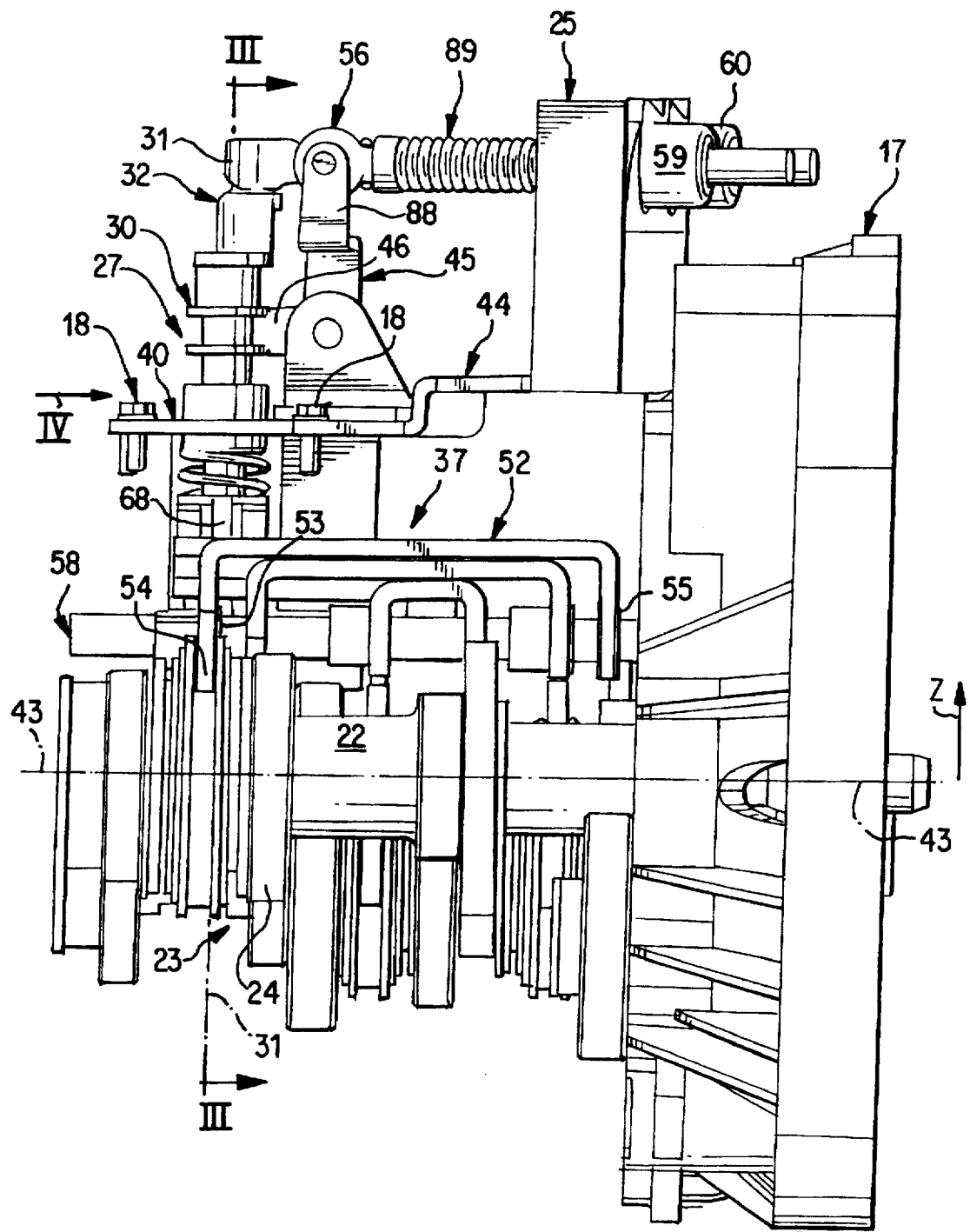
FIG. 2 is a front view of the gearbox looking in the direction of arrow II in FIG. 1, but in which the transmission housing has been removed and a clutch housing has been added.
Figure 5:
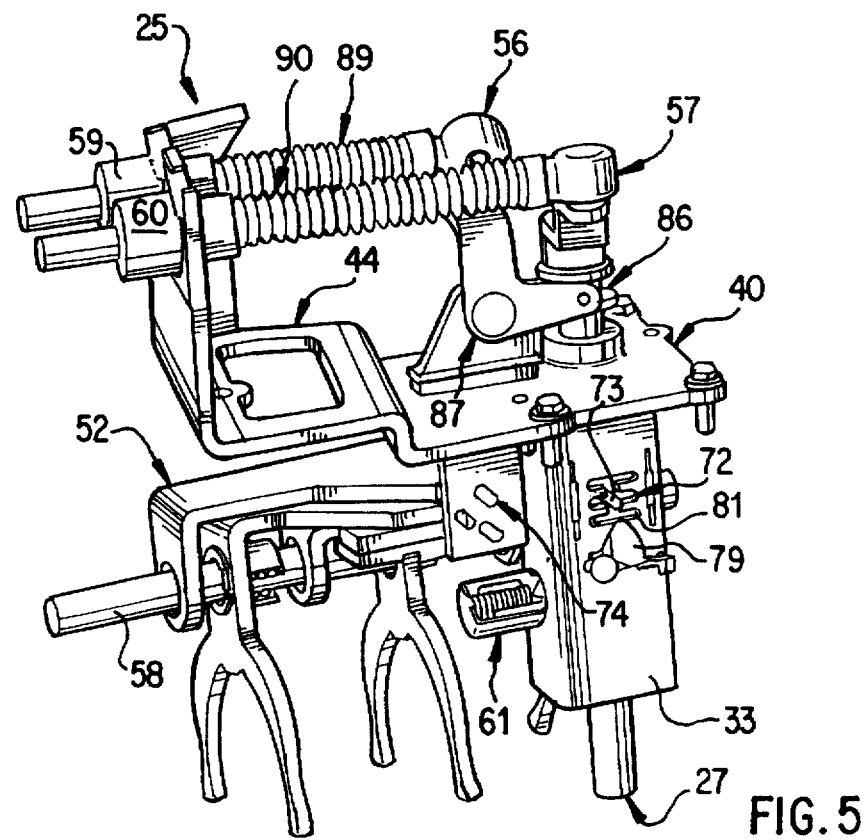
Figure 6:
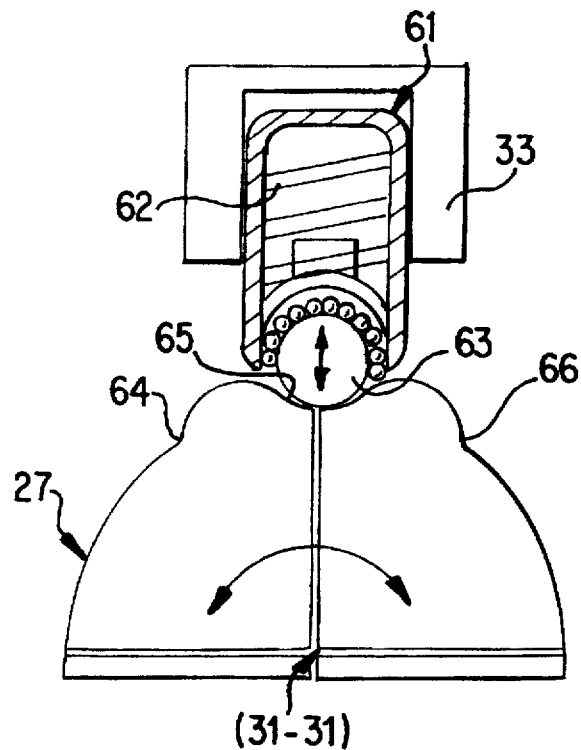
FIG. 6 is a schematic view of the locking device for three rotational angle positions of the shifter shaft of the gearbox of FIG. 1.
Figure 7:
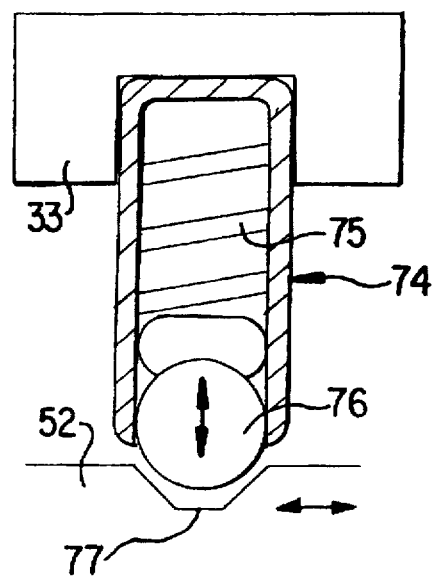
FIG. 7 is a schematic view of the locking device for the neutral position of the shift rails in the gearbox of FIG. 1.
Figure 8:
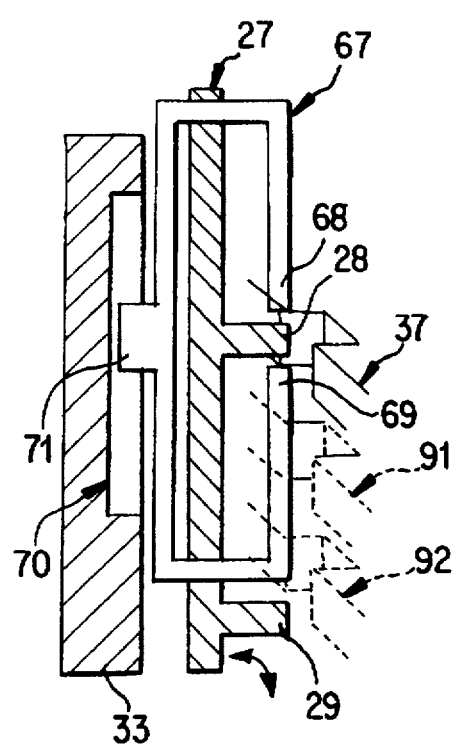
FIGS. 8 to 10 are schematic representations of three selected positions of the shifter shaft and the associated locking hoop in the gearbox of FIG. 1.

An outer housing part 44 (FIG. 2) of the shift housing part 25 which in the installed position is located outside the transmission housing 21 extends from mounting flange 40, on which a pivot bearing 87 (FIG. 5) is mounted for a two-armed reversing lever 45. One lever arm 46 of the reversing lever 45 is connected by a joint 86, to which a gate block of lever arm 46 engaging gate ring 30 belongs, with shifter shaft 27. The other lever arm 88 of reversing lever 45 is connected by a joint 56 with one end of a cable indicated at 89, whose other end is connected in a known manner with a manual shift lever. A guide bushing 59 of cable 89 is mounted in a slot-shaped receiving opening in the outer housing part 44. One end of another cable 90 is connected to the lever 48 of the shifter shaft 27 by joint 57, whose other end is likewise connected in known manner with a manual shift lever. A guide bushing 60 of cable 90 is mounted in another slot-like receiving opening of the outer housing part 44.

The shift console 33, the mounting flange 40, and the external housing part 44 are fixed with respect to one another and can therefore also form an integral shift housing part 25 which, for example, can be produced by diecasting. The shift rail 52, the shift fork 54, the bearing eyes 53, 55, the shifting groove 36 and lock 77 form a one-piece shift rail 37 by way of which the shift finger 28 operates the gear clutch 23.

Two other similar shift rails 91, 92 are used to operate the other two gear clutches and in corresponding fashion are mounted on the axis 58. In the neutral position of these three shift rails, in which the corresponding gear clutches are disengaged, their shifting grooves 36 are flush in a housing plane that contains housing axis 31—31 and is perpendicular to rotational axis 43—43, so that the shift finger 28 can be brought into engagement with one of the two shift rails 37 and 91 or shift finger 28 can be brought into engagement with shift rail 92 by axial displacement of the shifter shaft 27. If the shifter shaft 27 remains unactuated in the neutral position of the three shift rails, an adjustment of the shifter shaft 27 into its resting position 19 takes place by centering springs 84, 85 in a known manner, in which position its shift finger 28 is engaged with the shifting groove 36 of the shift rail 37.

In order to ensure secure locking of the neutral position of shift rails 37, 91, and 92, the shift console 33 has a corresponding recess 74 for each shift rail in which a locking ball 76 that is under the influence of a spring 75 is movably guided and can engage the corresponding lock 77 of the respective shift rail.

Operation of the shifter shaft 27 in the rotational directions of the shifter shaft axis 31—31 results in a lengthwise movement of shift rail 37, 91 or 92 which is engaged with a shift finger in order to engage a corresponding gear clutch. To provide secure locking for each of the three rotational angle positions of the shifter shaft 27 thus defined, the shift console 33 has a recess 61 for the radially movable guidance of a locking ball 63 which is under the influence of a spring 62. In corresponding fashion, the shifter shaft 27 has locking contours 64, 65, and 66 axially parallel to the shifter shaft axis 31—31. The contours engage locking ball 63 in the respective rotational angle position of the shifter shaft 27.

Locking hoop 67 which is located rotatably relative to the shifter shaft axis 31—31 and is axially nondisplaceable on the shifter shaft 27 engages with a guide part 71 located nonmovably thereon in a sliding guide 70 of the shift console 33 such that the locking hoop 67 is guided with respect to the shift console 33 in the directions of the shifter shaft axis 31—31, movably, but is guided immovably with respect to the rotational directions of the shifter shaft axis 31—31.

In the state of the shifter shown in FIGS. 1 to 8, the three shift rails 37, 91, and 92 are in their neutral position defined by the locks 77, and the shifter shaft 27 is in its resting position 19. Then locking cams 68 of the locking hoop 57 are in a nonengaged position above shift rail 37, the shift finger 28 is in the engaged position in shifting groove 36 of shift rail 37, the locking cam 69 of locking hoop 67 is in the engaged position with shifting grooves 36 of shift rails 91 and 92, and the shift finger 29 is in a nonengaged position below shift rail 92. By rotationally operating the shifter shaft 27, in this state the third or fourth forward gear can be engaged by engaging the corresponding gear clutch.

Figure 9:
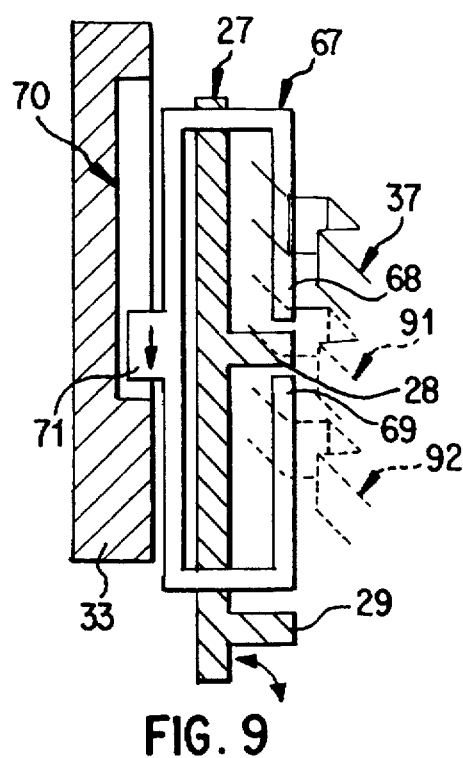

In the state of the shifter shown in FIG. 9, the shift rails 37, 91, and 92 are in their neutral position defined by locks 77 and shifter shaft 27 is in a neutral position such that shift finger 28 in the engaged position is in the shifting groove 36 of shift rail 91 and shift finger 29 is in a nonengaged position below shift rail 92. Then locking cams 68 engage shifting groove 36 of shift rail 37 and locking cam 69 engages shifting groove 36 of shift rail 92. In this state, by rotationally operating the shifter shaft 27, either the fifth forward speed or reverse gear can be engaged by engaging the corresponding gear clutch.

Figure 10:
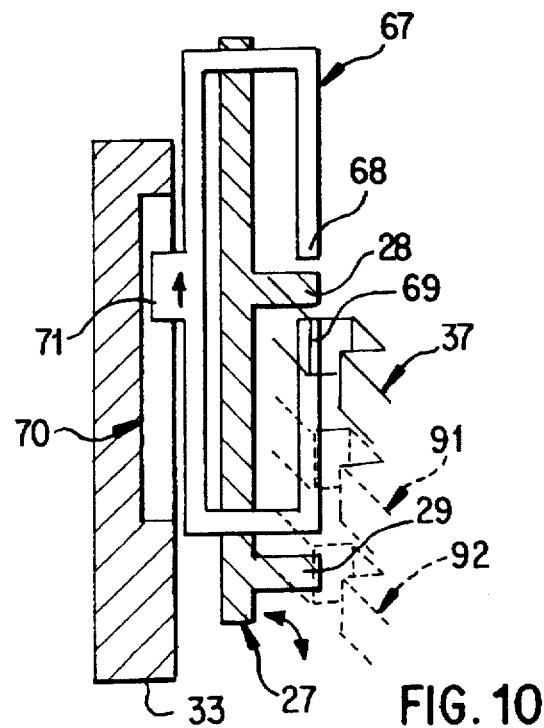
Figure 11:
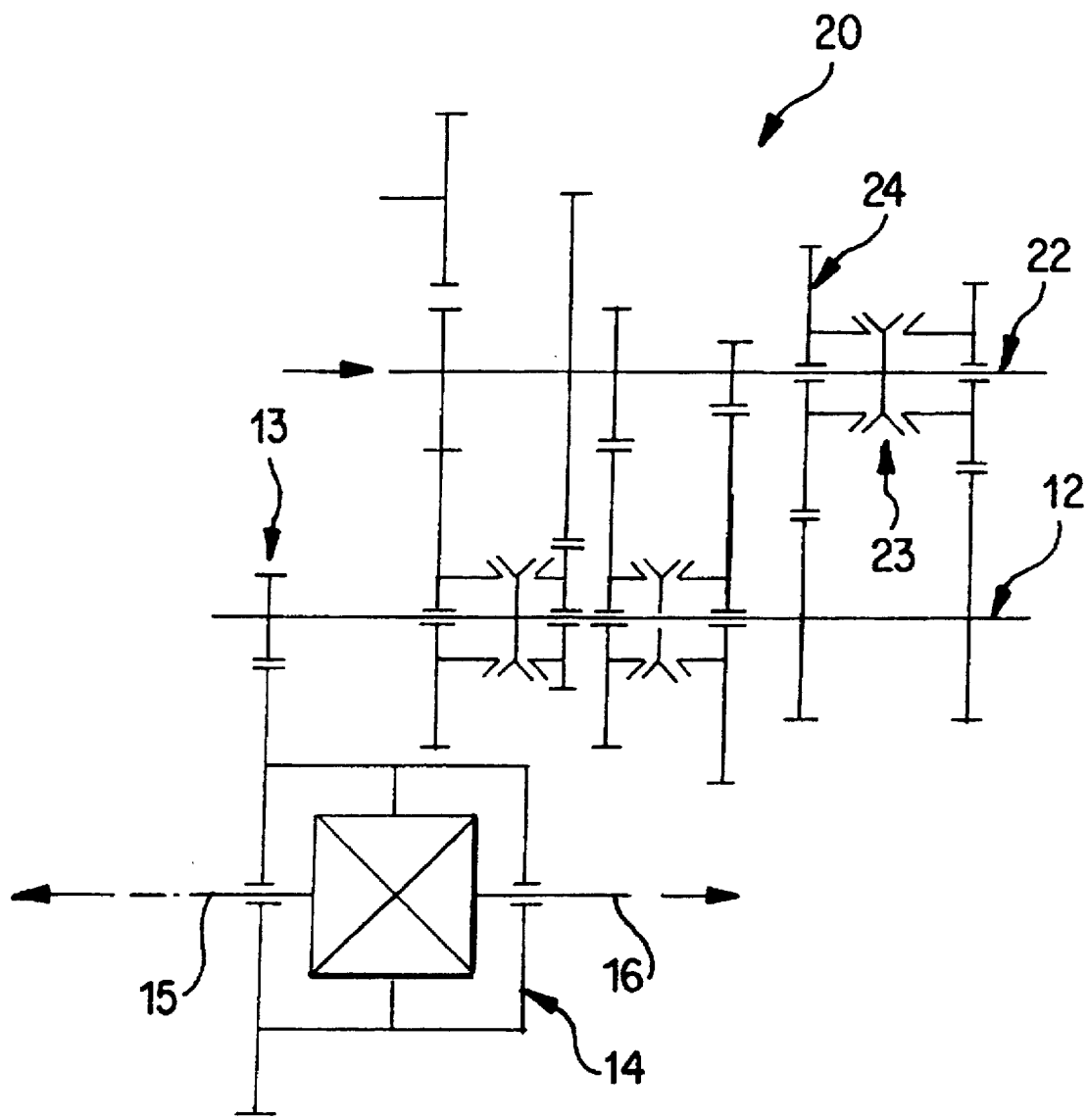
FIG. 11 is a schematic diagram of the gearbox in FIG. 1.

In the state of the shifter shown in FIG. 10, shift rails 37, 91, and 92 are in their neutral position defined by locks 77 and the shifter shaft 27 is in a neutral position such that the shift finger 28 and the locking cam 68 are each in a nonengaged position above the shift rail 17, the locking cam 69 is in an engaged position in the shifting grooves 36 of the shift rails 37, 91, and the shift finger 29 is in an engaged position in the shifting groove 36 of the shift rail 92. In this state, by rotationally actuating the shifter shaft 27, either the first or second forward gear can be engaged by engaging the corresponding gear clutch.

The shift console 33 has a gate guide 72 (FIG. 5) for the gate pin 73 of the shifter shaft 27 which consists of three parallel shift gates, each of which is associated with one of the shift rails 37, 91, and 92, and of a selector gate 80 which is associated with the resting position 19 and the neutral positions of the shifter shaft 27.

The shift console 33 has a pivotable locking cam 79 which is under the bias of a leg spring 78 located in the vicinity of the gate guide 72, namely in the transition between the selector gate 80 and the shift gate section 81 associated with reverse gear. The locking cam 79 prevents direct shifting to engage reverse gear when the gate pin 73 is in the shift gate section corresponding to fifth gear.

The shift console 33 has a switch 82 (FIG. 4) for engaging the backup light. The switch 82 is actuated by the shifting cam 83 when, as shown in FIG. 9, the shift finger 28 operates the shift rail 91 to engage reverse gear.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Shifting arrangement for a gearbox of a motor vehicle, comprising a transmission housing; a shift housing part positionally fixed in its position with respect to the transmission housing; a shifter shaft unit having a shifter shaft; at least one shift finger fixedly connected with the shifter shaft; shifting function members configured as detents of a detent device fixedly arranged with respect to the shifter shaft for fixing rotating angle positions of the shifter shaft via a movable detent element supported with elastic devices on a receiving device of the shift housing part, connecting devices connected with the shifter shaft so as to activate the shifter shaft along an axis of the shifter shaft, and connecting devices connected with the shifter shaft so as to activate the shifter shaft rotationally about the shifter shaft axis;

a detent device configured to fix a neutral position of shift rods, actuatable by the at least one shift finger with respect to the shift housing part, having receiving devices in the shift housing part, for elastic devices, a movable detent element supported on the elastic devices and a detent device respectively on each of the shift rods for engagement of the respective movable detent element;

a plurality of bearing arrangements aligned with a geometrical bearing axis of the shift housing part and fixed with respect to the shift housing part, for rotational and axially movable support of the shifter shaft unit, comprising an exterior bearing arrangement adjacent an exterior shaft end of the shifter shaft situated externally of the transmission housing, and an interior bearing arrangement adjacent a shaft end of the shifter shaft situated internally of the transmission housing;

a shift console fixedly arranged with respect to the shift housing;

a housing opening of the transmission housing for inserting the shift console which is aligned with the geometrical bearing axis and leads out in an abutting surface of the transmission housing which is situated in a housing plane perpendicular to the geometrical bearing axis;

a fastening flange of the shift housing part extending transversely to the geometrical bearing axis, having a flange opening aligned with the geometrical bearing axis and an abutting surface situated in a flange plane perpendicular to the geometrical bearing axis for fixing thereof with respect to the transmission housing which the exterior bearing arrangement being arranged in the flange opening and the interior bearing arrangement being arranged on an end of the shift console situated opposite thereto, and the exterior shaft end of the shifter shaft having the connecting devices, and the shift console, together with the shift finger, in the installed condition, is arranged inside the transmission housing, wherein the shift housing part and the shift console are one of rigidly connected with one another and constructed of one piece, with the flange opening receiving the exterior bearing arrangement leading out in the abutting surface of the shift housing part, and the abutting surface of the shift housing part having the mouth of the flange opening resting directly on the abutting surface of the transmission housing, the exterior bearing arrangement and the abutting surface of the transmission housing are in an axial area of the geometrical bearing axis, and, with the exception of the connecting devices for activating the shifter shaft, the shifter shaft unit, the shift-housing-side devices of the detent device for fixing the rotating angle positions, and the detent device for fixing the neutral position of the shift rods are arranged completely internally of the transmission housing.

2. The shifting arrangement according to claim 1, wherein a two-armed deflecting lever is swivellably disposed on an exterior section of the shift housing part situated in an installed position externally of the transmission housing, and has a lever arm connected by way of a joint with the connecting devices for activating the shifter shaft in the directions of the shifter shaft axis.

3. The shifting arrangement according to claim 1, wherein a lever has one joint half of a joint configured as a connecting device for activating the shifter shaft in the rotating directions.

4. The shifting arrangement according to claim 3, wherein a two-armed deflecting lever is swivellably disposed on an exterior section of the shift housing part situated in an installed position externally of the transmission housing, and has a lever arm connected by way of a joint with the connecting devices for activating the shifter shaft in the directions of the shifter shaft axis.

5. The shifting arrangement according to claim 1, wherein guiding devices for at least one cable pull are provided on an exterior section of the shift housing part situated in the installed position externally of the transmission housing.

6. The shifting arrangement according to claim 5, wherein a two-armed deflecting lever is swivellably disposed on an exterior section of the shift housing part situated in an installed position externally of the transmission housing, and has a lever arm connected by way of a joint with the connecting devices for activating the shifter shaft in the directions of the shifter shaft axis.

7. The shifting arrangement according to claim 6, wherein a lever has one joint half of a joint configured as a connecting device for activating the shifter shaft in the rotating directions.

8. The shifting arrangement according to claim 1, wherein a shift rod is arranged axially parallel and displaceable relative to a rotation axis of a transmission shaft and has two bearing lugs mutually offset along the rotation axis, a shift groove for engagement of the shift finger and a shift fork connected with a gear wheel coupling.

9. The shifting arrangement according to claim 8, wherein a two-armed deflecting lever is swivellably disposed on an exterior section of the shift housing part situated in an installed position externally of the transmission housing, and has a lever arm connected by way of a joint with the connecting devices for activating the shifter shaft in the directions of the shifter shaft axis.

10. The shifting arrangement according to claim 9, wherein a lever has one joint half of a joint configured as a connecting device for activating the shifter shaft in the rotating directions.

11. The shifting arrangement according to claim 10, wherein guiding devices for at least one cable pull are provided on an exterior section of the shift housing part situated in the installed position externally of the transmission housing.

12. The shifting arrangement according to claim 8, wherein the shift rod and the shift fork are configured in one piece.

13. The shifting arrangement according to claim 8, wherein the shift rod is displaceably disposed on a shaft arranged parallel to the rotation axis of the transmission shaft and is held in the transmission housing.

14. The shifting arrangement according to claim 1, wherein the shifter shaft unit has a second shift finger fixedly connected with the shifter shaft.

15. The shifting arrangement according to claim 1, wherein the shifter shaft unit has a locking hoop rotatably and non-axially displaceably arranged on the shifter shaft, and the shift console and the locking hoop have corresponding guides configured to immovably fix the locking hoop with respect to the rotating directions of the shifter shaft axis relative to the shift console.

16. The shifting arrangement according to claim 15, wherein a two-armed deflecting lever is swivellably disposed on an exterior section of the shift housing part situated in an installed position externally of the transmission housing, and has a lever arm connected by way of a joint with the connecting devices for activating the shifter shaft in the directions of the shifter shaft axis.

17. The shifting arrangement according to claim 16, wherein a lever has one joint half of a joint configured as a connecting device for activating the shifter shaft in the rotating directions.

18. The shifting arrangement according to claim 17, wherein guiding devices for at least one cable pull are provided on an exterior section of the shift housing part situated in the installed position externally of the transmission housing.

19. The shifting arrangement according to claim 18, wherein a shift rod is arranged axially parallel and displaceable relative to a rotation axis of a transmission shaft and has two bearing lugs mutually offset along the rotation axis, a shift groove for engagement of the shift finger and a shift fork connected with a gear wheel coupling.

20. The shifting arrangement according to claim 19, wherein the shift rod and the shift fork are configured in one piece.

21. The shifting arrangement according to claim 20, wherein the shifter shaft unit has a second shift finger fixedly connected with the shifter shaft.

* * * * *